United States Patent [19]

Guindulain Vidondo

[11] Patent Number: 5,067,634

[45] Date of Patent: Nov. 26, 1991

[54] SINGLE PRODUCT EXTRACTOR

[75] Inventor: Félix Guindulain Vidondo, Peralta, Spain

[73] Assignee: Jofemar, S.A., Peralta, Spain

[21] Appl. No.: 483,933

[22] Filed: Feb. 22, 1990

[30] Foreign Application Priority Data

Mar. 10, 1989 [ES] Spain .................................... 8900887

[51] Int. Cl.[5] ............................................. B65G 59/00

[52] U.S. Cl. ...................................... 221/298; 221/194

[58] Field of Search ............... 221/191, 194, 289, 290, 221/298, 294

[56] References Cited

U.S. PATENT DOCUMENTS

| | | | |
|---|---|---|---|
| 1,944,499 | 1/1934 | Crimp | 221/298 |
| 2,142,053 | 12/1938 | Hoban | 221/298 |
| 2,816,719 | 12/1957 | Richert | 221/298 |

FOREIGN PATENT DOCUMENTS

P8801706 7/1989 Spain .

*Primary Examiner*—Robert P. Olszewski
*Assistant Examiner*—Kenneth Noland
*Attorney, Agent, or Firm*—Darby & Darby

[57] ABSTRACT

Single product extractor, which is useful in automatic vending machines, which are coin operated, and which are mainly cigarette machines, consisting of a motor 3 which transmits the movement to a pinion 9 which locks in a toothed wheel 8 to which a cam 6 connects rotatably and eccentrically which by its other end connects to the L-shaped strip 4 where the packs 10 rest, by means of a pair of lugs 5. The spin axis of the L-shaped strip 4 serves as the spin axis of a strip 12, assisted by a spring, retaining the second pack while the first one is being expelled. The horizontal arm of the strip 4, where the packs rest, has a profile for placement of a micro 14 and of a pair of grooves for housing the respective pins 13.

4 Claims, 2 Drawing Sheets

SINGLE PRODUCT EXTRACTOR

OBJECT OF THE INVENTION

As is expressed in the title of the present specification, the following invention consists of a single product extractor, which is mainly to be used in automatic cigarette vending machines, for the extracting of single packs.

By means of the extractor that is proposed in the present specification, a vending machine lower and narrower than conventional vending machines is obtained, upon requiring less space for the drop of the pack towards the box where the user picks up the pack.

BACKGROUND OF THE INVENTION

Single extractors used in automatic cigarette vending machines have in the top of the frame stacked cigarette packs. The top surface is provided with a profile where an extractor pin which pushes the bottom pack so that it falls to the compartment so that the user pick it up moves. The top packs fall by their own weight on the frame and remain ready for another extraction.

Upon making the single extractors in the described manner, and the packs resting on the top base thereof, so that the packs remain free and can fall due to their weight, they must move all along the entire top surface of the extractor upon which it rests, with which the width must be considerable in order to allow the packs to remain free.

DESCRIPTION OF THE INVENTION

The single extractor which the following invention proposes, consists of a L-shaped strip between whose arms the cigarette packs rest, so that said L-shaped strip remains rotatably secured by its horizontal arm to a cam rotatably linked, by its other end, to a toothed wheel, which in turn locks in a pinion to which a drive motor transmits its rotary motion.

The cam remains connected to the toothed wheel eccentrically.

Thus, upon being driven the motor will transmit the rotary motion to the pinion locked in its shaft, which in turn transmits the motion to the toothed wheel which upon turning causes the cam to move with which the L-shaped strip upon which the cigarette packs rest turns causing the drop only of the bottom pack, since the pack located on top of it remains secured by means of a retaining strip which prevents its from dropping.

The horizontal arm of the L-shaped strip on which the cigarette packs rest has a micro and some retractable pins which in the rest position with the packs on it remain hidden in respective profiles of the same, while upon turning the micro remains free and reports the release of the pack, and the pins are operated by a pair of strips linked to the frame, in such a way that if the pack is connected to the base of the strip and does not drop by its own weight, said pins will push it so that it remains free and drops due to gravity.

In order to complete the description which is made hereinafter and for the purpose of providing a better understanding of its features, the present specification is accompanied by a set of drawings in whose figures the most significant details of he invention are represented.

BRIEF DESCRIPTION OF THE DESIGNS

FIG. 1. It shows a raised side view of the extractor in its rest position with the packs on the L-shaped strip which is driven by the motor that the extractor has.

FIG. 2. It shows a view of the extractor of the above figure, in the position when the bottom pack is expelled. It can be observed how in said position the second pack remains secured by the retaining strip in order to prevent it from dropping.

DESCRIPTION OF A PREFERRED EMBODIMENT

Figure 1:
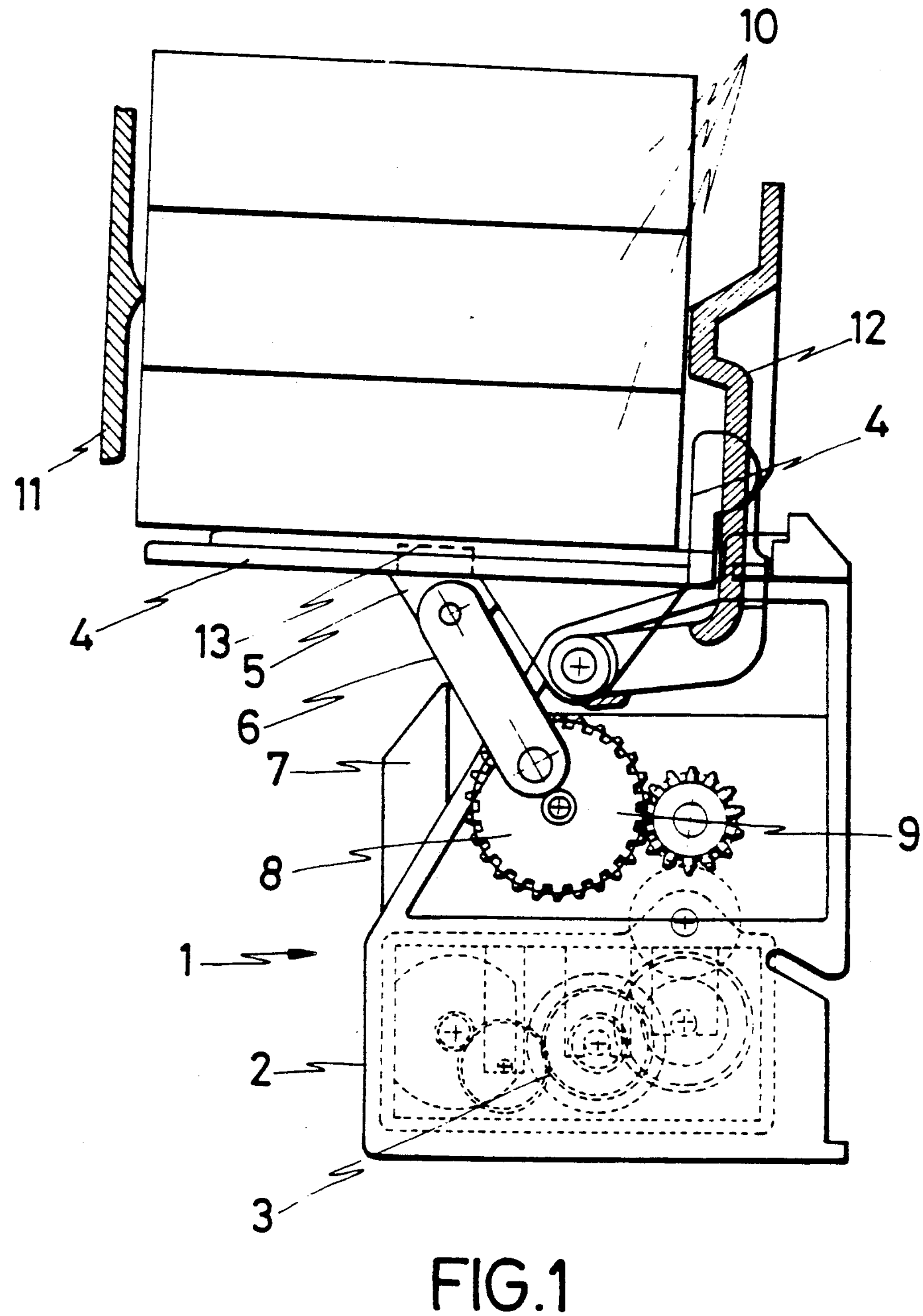
Figure 2:
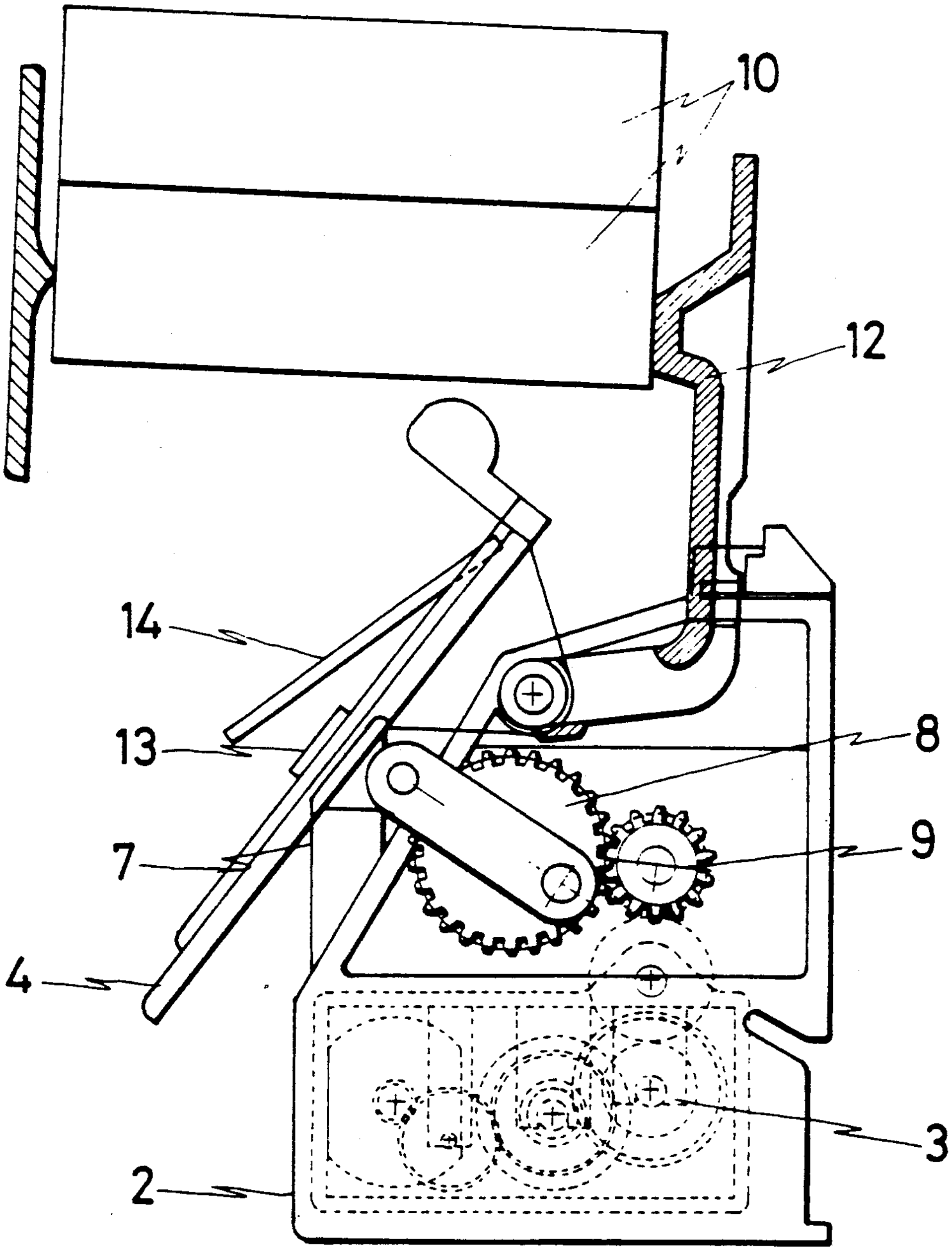

In view of the commented figures and in accordance with the numbering used, we can observe how the single product extractor 1 consists of a frame 2 inside of which there is a drive motor 3, likewise said frame 2 has rotatably connected the L-shaped strip 4 and a pair of strips 7.

The L-shaped strip 4 has beneath its horizontal arm a pair of lugs 5 to which the cam 6 is fixed rotatably. By its other end it connects rotatably and eccentrically to the toothed wheel 8 which locks in the pinion 9 and which in turn is locked in a pinion of the shaft transmitting the motion of the motor 3.

Hence, the packs 10 to be dispensed are stacked on the L-shaped strip in such a way that the packs remain between the wall 11 and the strip 12 which is assisted by a spring (not represented.) Said strip 12 remains positioned by the strip 4 and it does not knock against any pack 10 in the rest position, while upon turning the strip 4, the strip 12 turns by action of the spring which assists it, knocking against the second bottom pack 10 preventing it from dropping upon pressing against the wall 12.

The strip 4 has in its horizontal arm a profile for a microswitch 14. The microswitch 14 is activated after the article is dispensed. One or more movable plates 13 are positioned on the surface of the L-shaped strip 4 in holes in the L-shaped strip so as to be able to protrude above the surface of strip 4. Strips 7 mounted to the frame 2 are positioned below the movable plates 13. Upon rotation of the cam, the movable plates 13 contact strips 7, causing the movable plates 13 to be lifted in an upward direction above the surface of strip 4 and thereby dispense a pack which may have become stuck to the strip 4, thus avoiding undue collection of money because a pack has not been dispensed.

In this way, when the motor is activated the rotary motion will be transmitted to the pinion 9 which locks with the toothed wheel 8 producing the tilting of the L-shaped strip 4 upon drawing the cam 6 linked to it, rotatably and eccentrically, by one of its ends, while by its other end it connects rotatably to the lugs 5 of the strip 4.

Upon returning to its rest position the L-shaped strip 4, the strip 12 will release the bottom pack 10, all of them falling on the strip 4 and remaining ready for another dispensing.

Upon making the single extractor in the described manner, a lower and narrower vending machine can be obtained since the pack to be dispensed slides along the L-shaped strip 4 without having to emerge totally from it and therefore needing larger space for it.

Upon the second bottom pack remaining set between the wall 11 and the retaining strip 12, the dropping of more than one pack is avoided.

What is claimed is:

1. An apparatus for dispensing articles in an automatic vending machine comprising:

an L-shaped strip for supporting said articles to be dispensed one above the other, one leg of said L-shaped strip extending in an upward direction and the horizontal leg having a hole therethrough;

a movable plate positioned on the top surface of the horizontal leg of said L-shaped strip above said hole and contacting the bottom surface of the bottom one of said articles to be dispensed;

a motor having a rotatable shaft;

a pinion connected to said shaft, said pinion having a plurality of protrusions around the circumference of said pinion;

a toothed wheel interlocking with said plurality of protrusions;

a cam having one end coupled to said toothed wheel and the other end mounted to said L-shaped strip, said cam being rotated in response to said motor rotating said shaft so that the horizontal leg of said L-shaped strip is rotated in a downward direction;

a pair of retaining plates positioned on either side of said articles, one of said retaining plates being actuated by said cam being rotated so that said one of said retaining plates being actuated bears against one of said articles above the bottom one of said articles whereby said one of said articles above the bottom one of said articles is held between said pair of retaining plates; and a strip attached to said motor positioned below said movable plate and extending in an upward direction so that, when said horizontal leg of said L-shaped strip is rotated in said downward direction, said strip contacts said movable plate to lift said movable plate off of said L-shaped strip, thereby lifting the bottom one of said articles off of said L-shaped strip to dispense the bottom one of said articles.

2. An apparatus according to claim 1, wherein after the bottom one of said articles is dispensed said cam is rotated to lift the horizontal leg of said L-shaped strip back in an upward direction until said L-shaped strip is positioned in a horizontal direction below the articles and said one of said retaining plates being actuated is released from bearing against the one of the articles that had been above the now dispensed bottom one of the articles.

3. An apparatus according to claim 1, wherein said cam is mounted to said L-shaped strip with a pair of lugs positioned on either side of said L-shaped strip.

4. An apparatus according to claim 1, further comprising a microswitch being positioned above said movable plate on said L-shaped strip, said microswitch being activated after said bottom one of said articles is dispensed.

* * * * *